United States Patent
Bloom et al.

[19]

[11] Patent Number: 5,873,385
[45] Date of Patent: Feb. 23, 1999

[54] CHECK VALVE

[75] Inventors: Mark S. Bloom, Ventura County; Shahriar N. Niakan, Woodland Hills; Neil G. Bullock; Yuhung E. Yeh, both of Los Angeles County, all of Calif.

[73] Assignee: Emhart Inc., Newark, Del.

[21] Appl. No.: 897,543

[22] Filed: Jul. 21, 1997

[51] Int. Cl.$^6$ ................................................. F16K 15/00
[52] U.S. Cl. ...................... 137/543.19; 137/540; 137/535
[58] Field of Search ................... 137/535, 540, 137/543.19

[56] References Cited

U.S. PATENT DOCUMENTS

| | | | |
|---|---|---|---|
| 886,045 | 4/1908 | Ehrlich | 137/543.19 |
| 1,359,631 | 11/1920 | Teed . | |
| 2,214,459 | 9/1940 | Gottlieb | 251/145 |
| 2,349,155 | 5/1944 | Finley et al. | 251/119 |
| 2,506,306 | 5/1950 | Mantle | 137/543.19 |
| 2,895,503 | 7/1959 | Kolthoff, Jr. | 137/535 |
| 2,950,736 | 8/1960 | Oldberg | 137/529 |
| 3,627,209 | 12/1971 | Scott | 137/535 |
| 3,827,609 | 8/1974 | Arnaldo | 251/321 |
| 4,298,023 | 11/1981 | McGinnis | 137/529 |
| 4,445,535 | 5/1984 | Mayfield | 137/535 |
| 5,524,864 | 6/1996 | Dubach | 251/267 |
| 5,546,981 | 8/1996 | Li et al. | 137/493.3 |
| 5,577,533 | 11/1996 | Cook, Jr. | 137/540 |
| 5,636,794 | 6/1997 | Hess et al. | 137/540 |
| 5,692,539 | 12/1997 | Pickl, Jr. | 137/543.19 |

*Primary Examiner*—Denise L. Ferensic
*Assistant Examiner*—Joanne Y. Kim
*Attorney, Agent, or Firm*—Harold Weinstein

[57] ABSTRACT

A check valve 10 for a fluid passageway 12 or 14 of a pressure balancer 16 or the like, and having a base plate 40 with an opening 62 therethrough connected in the passageway 12 or 14. The underside 42 of the base plate 40 disposed in the passageway 12 or 14 to face normal flow therein and the upperside 44 facing the opposite direction. A substantially "U" shaped frame member 79 is connected on the upperside 44 of the base plate 40. The frame member 79 carries two leg members 52 and 54 extending from the upperside 44 of the base plate 40 on opposite sides of the opening 62 with a bridge member 72 carried by the leg members 52 and 54 to span the opening 62. A closure member 92 is disposed on the upperside 44 of the base plate 40 adjacent the opening 62. A spring member 80 is connected between the frame member 79 and the closure member 92 normally to urge the closure member 92 to close the opening 62 whenever the flow in the passageway 12 or 14 is less than 5 psi.

5 Claims, 3 Drawing Sheets

CHECK VALVE

BACKGROUND OF THE INVENTION

The invention relates to a check valve; particularly, to a check valve for use in a pressure responsive device, such as a pressure balancer, wherein the check valve not only prevents backflow, but may also reduce or eliminate water hammer.

A conventional check valve will be made of many parts that required assembly and include a relatively expensive spring, such as one made of metal. Also, connecting a check valve in a passageway of the housing might require the use of an additional or special fastener.

SUMMARY OF THE INVENTION

It is an object of the present invention to provide a check valve which is simple to manufacture and assemble, economical to produce and highly reliable to operate.

It is another object of the present invention to provide a check valve having fewer parts then the conventional check valve and one that is connected in a passageway of the housing along with the assembly of the housing so that no special or additional fasteners are required.

It is another object of the present invention to provide a check valve that both prevents backflow and reduces or eliminates water hammer.

It is another object of the present invention to make all of the components of the check valve of the same material, such as acetal (plastic), so that the spring may also be integrally formed therein.

It is still another object of the present invention to use a spring member having a sinusoidal shape to maximize its area and, thus, spread the forces acting on the spring member over a larger area to prevent over stressing, fatigue or permanent deformation of the spring member.

It is still another object of the present invention is to mold the check valve of components which are connectable together to form the check valve, with the addition thereto of an optional O-ring which, when used, will engage and seal the opening through the check valve.

Other objects, features and advantages of the present invention will become more fully apparent from the following description of the present invention, the appended claims and the accompanying drawings.

DETAILED DESCRIPTION OF THE INVENTION

Figure 1:
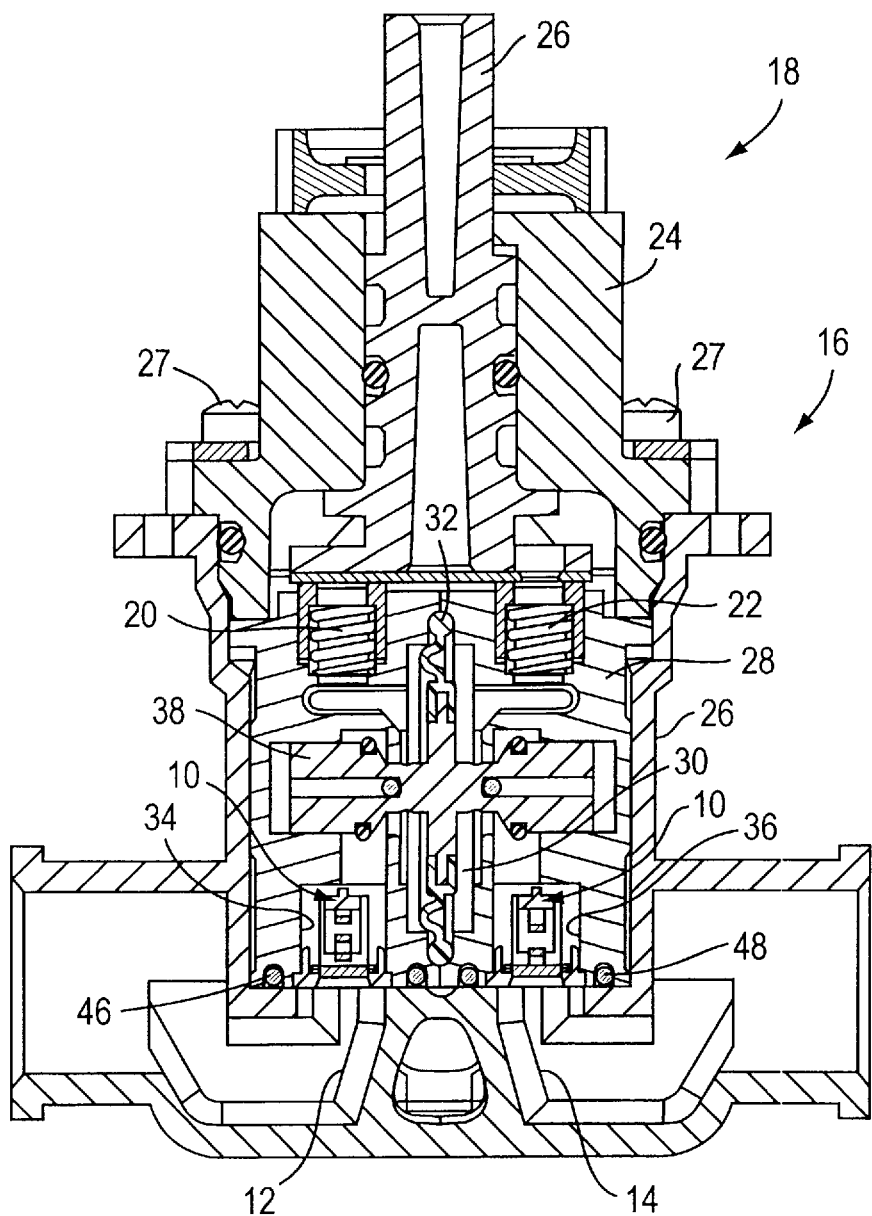
FIG. 1 is a side elevational view of a pressure balancer in which the check valve of the present invention is mounted in the inlet passageways thereof.

FIG. 1 shows check valves 10, which are the first embodiment of the invention, mounted in the hot water passageway 12 and the cold water passageway 14 of a pressure balancer 16 of the diaphragm type which is shown and described in U.S. Pat. No. 5,501,244 issued Nov. 14, 1994, but other types of pressure balancers could have been used, such as temperature responsive or spool type. The pressure balancer 16 will discharge its flow into a valve 18. The valve 18 is connected to receive and mix the discharge flow from openings 20 and 22 of the pressure balancer 16. The valve 18 has a housing 24 in which is mounted a valve stem 26, the rotation of which controls the flow from the openings 20 and 22. Fasteners 27 connect the housing 24 to the housing 26 of the pressure balancer 16. The housing 26 has the passageways 12 and 14 formed therein. The check valves 10 permit water to flow from the passageways 12 and 14 into the pressure balancer 16 once the water pressure has reached a level of 5 psi. The check valves 10 also precludes the reverse flow of the water from the pressure balancer 16 to the passageways 12 and 14. The pressure balancer 16 has a cartridge 28 formed with two halves joined together in the housing 26. The cartridge 28 has a central cavity 30 divided by a diaphragm 32 to receive the flow from inlets 34 (hot) and 36 (cold) of the cartridge 28, which inlets 34 and 36 respectively communicate with passageways 12 and 14. A poppet assembly 38 carries the diaphragm 32 and is mounted in the cartridge 28 to balance the pressure of the hot and cold water flow in the pressure balancer 16 from the passageways 12 and 14 and inlets 34 and 36, respectively.

Figure 2:
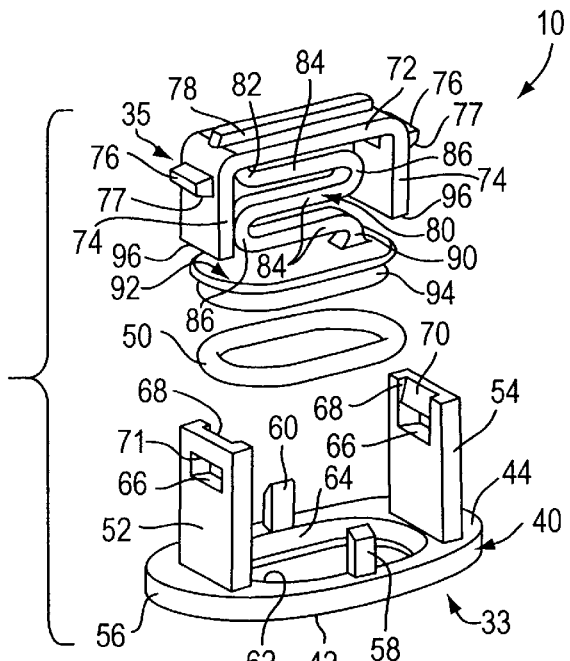
FIG. 2 is an exploded perspective view of one embodiment of the present invention.

The check valve 10, as shown best in FIG. 2, has a base plate 40 which is clamped between the housing 26 at its underside or bottom 42 at the passageways 12 and 14 and the cartridge 28 at its upperside or top 44 at the inlets 34 and 36, as illustrated in FIG. 1. O-rings 46 and 48 seal the connection between the housing 26 and the cartridge 28 to prevent leakage from passageways 12 and 14 or inlets 34 and 26. All of the flow from the passageways 12 and 14 into inlets 34 and 36, respectively, must pass through the check valves 10 mounted thereacross.

The general oval shape of the base plate 40 corresponds to, and is sufficiently larger than, the opening it spaces. Accordingly, the check valve 10 is mounted across the passageways 12 and 14 and inlets 34 and 36, respectively. The check valve 10 is mounted with its upper structure inserted into the respective inlets 34 and 36 and its underside 42 straddled across the respective passageways 12 or 14. Flow of hot water from passageway 12 into inlet 34 and of cold water from passageway 14 into inlet 36 will not begin until the spring pressure of the normally closed check valve 10 is overcome at about a water pressure level of 5 psi. If reverse flow of water were to occur in pressure balancer 16 due to a failure of the hot and/or cold water supply, the force of the reverse-flow water, in addition to the force of the spring pressure, will prevent flow of such water into the hot and/or cold water supply by the check valve 10 stopping the flow of water into the respective passageways 12 and 14. The check valves 10 illustrated in FIG. 1 are also effective in preventing the propagation of water hammer, should it occur.

FIGS. 2 through 6 shows the first embodiment of the check valve 10 that is mounted across the respective passageways 12 and 14 and inlets 34 and 36, as shown in FIG. 1. The check valve 10 is composed of two molded plastic (acetal) pieces 33 and 35 that are snap-fitted together and to which has been added an optional O-ring. 50 for purposes more fully described hereinafter. The lower piece 33 of the check valve 10 includes the base plate 40 formed substantially oval which corresponds to and is slightly larger than the shape of the respective inlets 34 and 36. The underside 42 of the base plate 40 is substantially flat while the upperside 44 has two mirror image columns or outer leg members 52 and 54 extending upwardly from opposite ends inwardly of the circumference 56 thereof. Two short mirror image guide members 58 and 60 extend upwardly from the upperside 44 inwardly of the circumference 56 mid way of the side of the base plate 40. Inwardly of the columns 52 and 54 and guide members 58 and 60 is a large central through opening 62 that extends axially from the underside 42 to the upperside 44. An inwardly tapered seat 64 is formed to extend from the upperside 44 to terminate a short distance from the underside 42. The upper ends of the columns 52 and 54 have a lateral hole 66 which extends from the outer side thereof to a recess 68 that extends from the top inner side with the upper inner wall 70 above the hole 66 that is tapered inwardly to terminate at a downwardly facing step 71 which defines the top wall of the hole 66.

Figure 3:
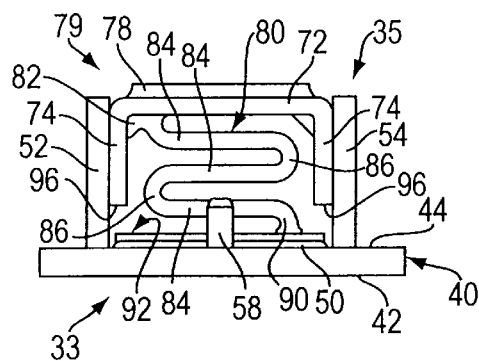
FIG. 3 is a front elevational view of the embodiment of the present invention illustrated in FIG. 2 in which the check valve is shown in the closed position.
Figure 6:
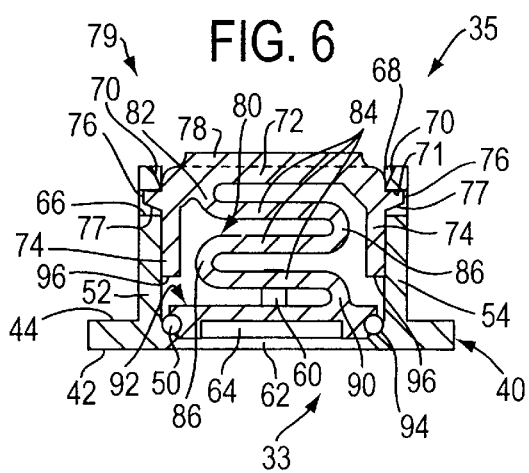
FIG. 6 is a sectional elevational view taken along line 6—6 of FIG. 5.

The check valve 10 shown in FIGS. 2 through 6 has the second upper molded piece 35 in the form of an inverted "U" shaped bridge or cross piece 72, the ends of which form downwardly extending inner leg members 74 that is shorter in length than the outer leg members 52 and 54. An outwardly extending ear or short projection 76 is formed on the upper outer end of the leg member 74 below the bridge 72. The ear 76 is sized to fit within the holes 66 and has an upwardly, outwardly tapered underside 77 adapted to co-act in sliding engagement with the recess taper 70. A rib 78 extends along the upperside of the bridge 72 from end to end to stiffen the same. An integral sinusoidal spring member 80 is formed on the piece 35 with its upper end 82 extending downwardly from the underside of the bridge 72 adjacent one of the inner leg members 74 to turn into a horizontal leg 84, of which there are three that are joined at slightly lower elevations by the end loops 86, with one end loop 86 formed on the right and one end loop 86 on the left. The lower end 90 of the spring member 80 connects to substantially horizontally disposed closure member or lid 92 that is shaped to sealingly engage the opening 62. The outer circumference of the closure member 92 has an annular groove 94 that is adapted to receive the O-ring 50 which, as best seen in FIGS. 3 and 6, will engage and seal against the tapered seat 64 of the opening 62 to close the check valve 10, thus preventing flow through the respective passageways 12 and 14 and inlets 34 and 36. The use of the O-ring 50 and the annular groove 94 are optional. When used as shown in the drawings, the O-ring 50 will be mounted into the groove 94 of the closure member 92. The upper and lower molded pieces 33 and 35, respectively, are connected to each other by fitting the inner leg members 74 on the inside of the outer leg members 52 and 54 and lowering the bridge 72 until the ears or projections 76 engage the recesses 68 so that the cooperative tapers on the underside 77 of the ear 76 and taper 70 of recess 66 slide along each other to cause the outer leg members 52 and 54 to yield and temporarily move away from each other to allow the snap-fit of the ears 76 into the holes 66. The length of the bridge 72 is substantially the same length as the inner span between the outer leg members 52 and 54 so that, once connected, the two pieces 33 and 35 form a solid frame 79 for the check valve 10. The spring member 80 is connected to extend from the bridge 72 of the frame 79 and is disposed entirely with the frame 79 so that all of its yielding or restoring forces act upon the closure member 92 with maximum efficiency and longer life.

Figure 4:
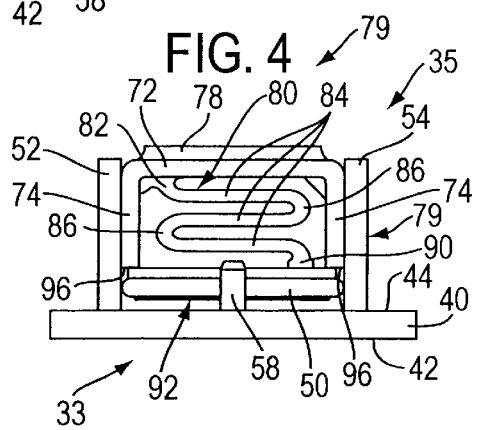
FIG. 4 is a front elevational view of the embodiment of the present invention illustrated in FIG. 2 in which the check valve is shown in the open position.
Figure 5:
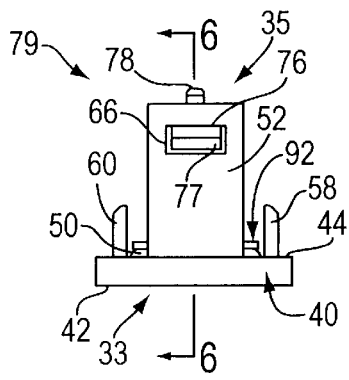
FIG. 5 is a side elevational view of the embodiment of the present invention illustrated in FIG. 3.

In operation, and before water flows, the check valve 10 will be closed, as shown in FIGS. 3 and 6, wherein the O-ring 50 will engage the annular seat 64 so that the base plate 40 and the closure member 92 combine to form a solid blockage across the respective passageways 12 and 14 and the inlets 34 and 36. Upon the water pressure in the hot and cold water supply reaching 5 psi or higher, the force of the spring member 80 of the check valve 10 will be overcome and the closure member 92 will be raised upwardly, as shown in FIG. 4 to permit flow through the opening 62 of the check valve 10. Guide members 58 and 60 are provided on the upperside 44 of the base plate 40 to control the motion of the closure member 92 in the vertical direction and limit any lateral movement thereof. Also, the bottom edges of the inner legs 74 act as a stop 96, best seen in FIG. 4, to prevent and limit the upward movement of the closure member 92 to a predetermined amount. This permits the check valve 10 to allow the proper design flow therethrough and prevents premature failure due to stressing of the spring member 80. By utilizing a sinusoidal spring member 80, the maximum amount of area is provided to minimize the stress and fatigue of the spring material. This ensures long life for the spring member 80 and the check valve 10.

Figure 7:
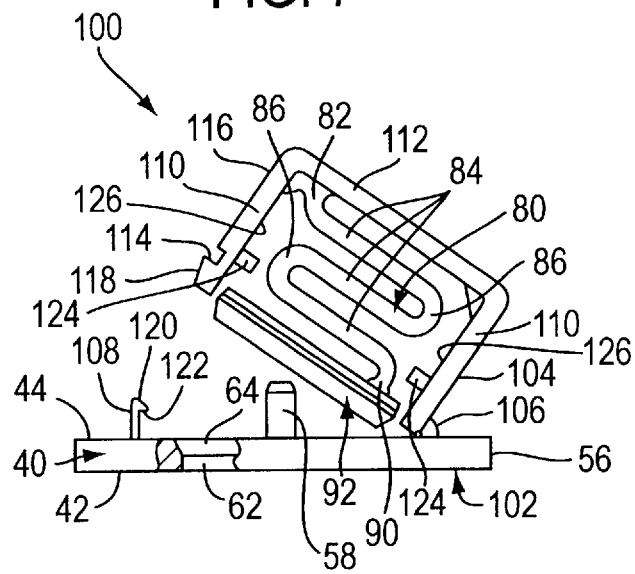
FIG. 7 is a front elevational view of a second embodiment of the present invention showing the check valve of the present invention molded in one piece.
Figure 8:
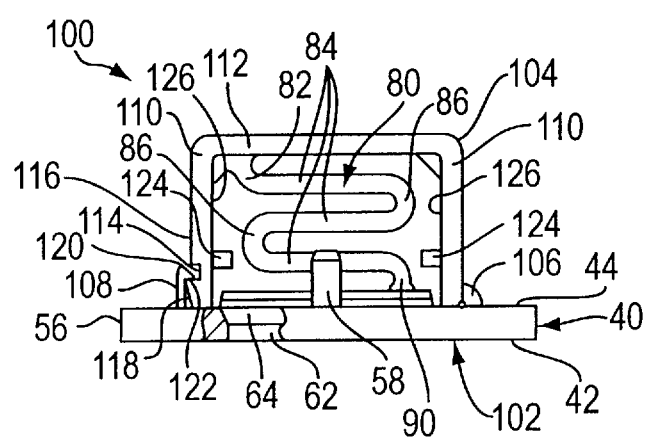
FIG. 8 is a front elevational view of the second embodiment of the present invention illustrated in FIG. 7 in assembled position in which the frame is connected to the base plate thereof.

A second embodiment of the invention is illustrated in FIGS. 7 and 8, wherein the same reference characters will be used for the same components shown and described hereinbefore for FIGS. 2 through 6 for the first embodiment of the invention. Any modifications or changes in the component will be described and given a new reference character. FIG. 7 shows the second embodiment of the invention to be a check valve 100 that is molded and will form a one-piece unitary structure 102 that hinges the inverted "U" shaped frame 104 to the base plate 40 at hinge member 106. The base plate 40 has a flat underside 42 and upperside 44. There will be two guide members, of which only 58 is shown, in FIGS. 7 and 8 that extend upwardly from the upperside 44 along the side of the base plate 40 and inwardly of the outer circumference 56. A short hook 108 extends upwardly from the upperside 44 inwardly of the opposite end thereof from the hinge 106. Spaced from and inwardly of the hinge 106 and the hook 108 and the guide members (only 58 being shown in FIGS. 7 and 8) is a large central through opening 62 that extends axially from the underside 42 to the upperside 44. An inwardly tapered seat 64 is formed to extend from the upperside 44 to terminate a short distance from the underside 42.

The frame 104 shown in FIGS. 7 and 8 includes a pair of leg members 110 spaced from each other by a bridge or cross piece 112 that interconnects the legs 110 to form the frame 104 which extends from the hinge 106 to define the inverted "U" shape. The legs 110 are each the same length so that, as shown in FIG. 8, when the frame 104 is connected to the base plate 40, the legs 110 are substantially perpendicular to the base plate 40 and the bridge 112 is substantially parallel thereto. A recess 114 is formed on the outer side 116 of the leg 110 remote from the hinge 106. The outer side 116 has a lower tapered section 118 that extends from the bottom of the leg 110 upwardly and outwardly at a small angle to terminate at the lower edge of the recess 114. A co-acting tapered section 120 extends downwardly and inwardly from the upper end of the hook 108 to terminate in a flat lower flange 122. To complete the assembly, the unitary structure 102 of the check valve 100, the frame is pivoted counter clockwise from the position illustrated in FIG. 7 at the hinge 106 to lower the leg 110 adjacent the hook 108 and cause the co-acting respective tapered sections 118 and 120 to increasingly engage and temporarily distort the hook 108 and the leg 110 until the flange 122 of the hook 108 is seated upon the lower edge of the recess 114 as shown in FIG. 8. This locks the frame 104 upon the base plate 40 in an assembled rigid position. A pair of short horizontally disposed stops 124 are formed facing each other at the lower end the inner side 126 of the legs 110 at a location from the bottom thereof about 25% of its length and, as shown in FIG. 8, up from the base plate 40. A serpentine spring member 80 of the same type as described and illustrated in the first embodiment of the invention is used in the check valve 100. The upper end 82 is connected to extend from the underside of the bridge 112 adjacent the leg 110 remote from the hinge 106. The spring member 80 is sinusoidal in shape with three descending horizontally disposed legs 84 joined together by the end loops 86 with one formed on the right side and the other formed on the left side to continuously connect the coiled spring member 80 in one snake-like resilient line with the lower end 90 thereof connected into the top right side of a closure member or lid 92 that is formed to lie in a plane parallel to the bridge 112 and, as shown in FIG. 8, when the frame 104 is connected to the base plate 40 will lie in a plane parallel to the base plate 40. The closure member 92 has its outer circumference formed in the same oval shape as the opening 62. The closure member, as shown in FIG. 8, will engage the tapered seat 64 thereof normally to close and seal the opening 62 to the check valve 100. In the second embodiment shown in FIGS. 7 and 8, the optional O-ring is not used to seal the opening 62. The check valve 100 will be mounted as shown in FIG. 1 wherein the base plate 40 will be sealingly clamped between the housing 26 and the pressure balancer cartridge 28 with the frame 104 extending into the respective inlets 34 and 36. The check valve 100 is normally closed and, if open, will also close whenever the backflow and spring pressure combine to equal a greater force than that existing in the respective passageways 12 and 14. However, absent a hot or cold water supply failure or a substantial backflow pressure, upon the pressure in the respective passageways reaching 5 psi, the check valve 100 will open (not shown) in the same manner as was shown and described for the first embodiment. The opening of the closure member is guided by the guide members 58 and 60 (not shown) and is limited in the vertical direction by the stops 124 to prevent over stressing or fatigue of the spring member 80. The sinusoidal shape of the spring member 80 maximizes the resilient properties of the acetal plastic material while spreading the stress over the largest area. The check valve 100 offers the same advantages as that set forth hereinbefore for the check valve 10.

The check valves 10 and 100, shown and described above, are made of inexpensive material consisting of one or two components that are interconnected together to form the respective valves. As set forth above, no special or separate fasteners are required to mount either of the respective check valves 10 or 100 at the inlets 34 and 36 of the pressure balancer 16. Also, check valves 10 and/or 100 do not require the use of more expensive metal springs, but rather, utilize the sinusoidal design of the plastic material for its resiliency and long life.

In general, the above-identified embodiments are not to be construed as limiting the breadth of the present invention. Modifications and other alternative constructions will be apparent which are within the spirit and scope of the invention as defined in the appended claims.

What is claimed is:

1. A check valve for a fluid passageway comprising:

a. a base plate having an upperside and a underside connected in the passageway with the upperside remote from the direction of normal flow in the passageway and the underside facing normal flow in the passageway;

b. the base plate having an opening extending from the underside to the upperside thereof;

c. a substantially inverted "U" shaped frame connected on the upperside of the base plate;

d. the frame, including a bridge member and two leg members, with the bridge member disposed across the adjacent leg members that span the opening;

e. a closure member disposed on the upperside of the base plate and adapted to close the opening therethrough;

f. a sinusoidal spring member connected between the frame and the closure member normally to urge the closure member to close the opening upon the flow pressure in the passageway being less than 5 psi;

g. the leg members are formed integrally with the base plate;

h. the bridge member is separate from and connected to the leg members;

i. a stop member is formed on the inner side of each leg member in spaced relationship to the bridge member to limit the movement of the closure member away from the base plate upon the spring member being depressed;

j. a recess formed on the periphery of the closure member; and k. an O-ring disposed in the recess and adapted to seal the opening upon the closure member engaging the opening to close the opening.

2. The combination claimed in claim 1 wherein:

a. the bridge member, the spring member and the closure member integrally formed;

b. one end of the spring member is connected to extend from the bridge member adjacent one leg member and the other end of the spring member is connected to extend from the closure member adjacent the other leg member;

c. the bridge member extends across the leg members adjacent the tops thereof.

3. The combination claimed in claim 2 wherein:

a. least one guide member is formed on the upperside of the base plate to guide the opening and closing of the closure member.

4. The combination claimed in claim 3 wherein:

a. the spring member is disposed wholly within the frame.

5. A check valve for a fluid passageway comprising:

a. the check valve is formed of plastic material;

b. a frame member and a base plate integrally formed and adapted to be connected to each other;

c. the base plate having an upperside and an underside connected in the passageway with the upperside remote from the direction of normal flow in the passageway and the underside facing normal flow in the passageway;

d. the base plate having an opening extending from the underside to the upperside thereof;

e. the frame member formed in the shape of a substantially inverted "U" and disposed on the upperside of the base plate;

f. the frame member having a pair of leg members connected by a bridge member with a spring member formed to extend from the frame member and carrying a closure member at the end of the spring member remote from the frame member;

g. the bridge member disposed across the opening of the base plate with the closure member disposed between the bridge member and opening of the base plate;

h. one of the leg members being hinge-connected to the base plate and the other leg member removably affixed to the base plate to place the closure member in assembled operative position whereby flow through the opening of the plate member can occur or be stopped by the closure member disengaging or engaging said opening;

i. the spring member formed in a sinusoidal shape and normally to urge the closure member to close the opening of the plate member upon the flow pressure in the passageway being less than 5 psi; and j. a stop member is formed on the inner side of each leg member in spaced relationship to the bridge member to limit the movement of the closure member away from the base plate upon the spring member being depressed.

* * * * *